United States Patent
Nelson et al.

(10) Patent No.: US 6,821,493 B2
(45) Date of Patent: Nov. 23, 2004

(54) NON-THERMAL PLASMA REACTOR SUBSTRATE DESIGN-E-SHAPE WITH LOW LOSS ELECTRODE PATTERN

(75) Inventors: David Emil Nelson, Independence Township, MI (US); Bob Xiaobin Li, Grand Blanc, MI (US); Delbert L. Lessor, Richland, WA (US)

(73) Assignee: Delphi Technologies, Inc., Troy, MI (US)

(*) Notice: Subject to any disclaimer, the term of this patent is extended or adjusted under 35 U.S.C. 154(b) by 290 days.

(21) Appl. No.: 10/114,010

(22) Filed: Mar. 28, 2002

(65) Prior Publication Data

US 2003/0007907 A1 Jan. 9, 2003

Related U.S. Application Data

(60) Provisional application No. 60/280,860, filed on Apr. 2, 2001.

(51) Int. Cl.[7] .............................................. B01J 19/08
(52) U.S. Cl. ..................... 422/186.04; 60/275; 427/404
(58) Field of Search ...................... 422/186.04; 60/275; 427/404

(56) References Cited

U.S. PATENT DOCUMENTS 5,407,639 A * 4/1995 Watanabe et al. ...... 422/186.07
6,284,204 B1 * 9/2001 Cole et al. ............. 422/186.07
6,338,827 B1    1/2002 Nelson et al.
6,354,903 B1    3/2002 Nelson
6,368,451 B1    4/2002 Goulette et al.
6,423,190 B2    7/2002 Hemingway et al.
6,464,945 B1   10/2002 Hemingway
6,482,368 B2   11/2002 Hemingway et al.
6,537,507 B2    3/2003 Nelson et al.
6,638,484 B2   10/2003 Nelson et al.

* cited by examiner

*Primary Examiner*—Kishor Mayekar
(74) *Attorney, Agent, or Firm*—Paul L. Marshall

(57) ABSTRACT

A low-loss electrode-printed structural dielectric barrier for a non-thermal plasma reactor and non-thermal plasma multi-cell stacks having low-loss electrodes. The low-loss electrode-printed structural dielectric barriers include a structural dielectric barrier having a first side and a second opposite side; a low-loss electrode pattern disposed on the second side of the structural dielectric barrier; the low-loss electrode pattern comprising first and second major electrode sections that are offset from any ribs, supports, ligaments, spacers, tines, or other structure that serves as a structural dielectric connection between dielectric barriers in a multi-cell stack, a connector disposed between and electrically connecting the first and second major electrode sections and offset relative to a centerline perpendicular to the rib orientation, and a bus path connector electrically connected to one of the major electrode sections and offset relative to the centerline.

25 Claims, 2 Drawing Sheets

NON-THERMAL PLASMA REACTOR SUBSTRATE DESIGN-E-SHAPE WITH LOW LOSS ELECTRODE PATTERN

CROSS-REFERENCE TO RELATED APPLICATIONS

The present application claims priority to U.S. Provisional Application No. 60/280,860, of David E. Nelson, et al., filed Apr. 2, 2001, entitled "Non-thermal Plasma Reactor Substrate Design—E-shape With Low-Loss Electrode Pattern," which is hereby incorporated by reference herein in its entirety.

TECHNICAL FIELD

The present invention relates to reactors for chemical reduction of nitrogen oxide (NOx) emissions in the exhaust gases of automotive engines, particularly diesel and other engines operating with lean air fuel mixtures that produce relatively high emission of NOx and method of manufacturing the same. More particularly, the invention relates to a low-loss electrode-printed structural dielectric barrier for a non-thermal plasma reactor and to improved non-thermal plasma reactor multi-cell stacks having structural dielectric barriers printed with low-loss electrode patterns.

BACKGROUND OF THE INVENTION

In recent years, non-thermal plasma generated in a packed bed reactor has been shown to be effective in reducing oxides of nitrogen (NOx) produced by power plants and standby generators. These units usually have a reducing agent, such as urea, to enhance the conversion efficiency. The packed bed reactor consists essentially of a high voltage center electrode inserted into a cylinder of dielectric material, usually a form of glass or quartz. An outside or ground electrode is formed by a coating of metal in various forms, including, tape, flame spray, mesh, etc. The space between the center electrode and the inside diameter of the dielectric tube is filled or packed with small diameter glass beads. When high voltage alternating current is applied to the center electrode, the surfaces of the beads go into corona, producing a highly reactive and selective surface for inducing the desired reaction in the gas.

Unfortunately, the packed bed design with loose beads and glass dielectric is impractical for use in the conditions found in a mobile emitter, such as a car or truck. The vibration and wide temperature swings of the vehicle system would damage the packed bed and the necessary temperature and vibration isolation needed to make it survive would not be cost effective.

A non-thermal plasma reactor for use with diesel engines and other engines operating with lean air fuel mixtures is disclosed in commonly assigned U.S. patent application Ser. No. 09/465,073, filed Dec. 16, 1999, entitled "Non-thermal Plasma Exhaust NOx Reactor, which is hereby incorporated by reference herein in its entirety." Disclosed therein is a reactor element comprising high dielectric, nonporous, high temperature insulating means defining a group of relatively thin stacked cells forming gas passages and separated by the insulating means. Alternate ground and charge carrying electrodes in the insulating means on opposite sides of the cells are disposed close to, but electrically insulated from, the cells by the insulating means. The electrodes may be silver or platinum material coated onto alumina plates. Conductive ink is sandwiched between two thin nonporous alumina plates or other suitable insulating plates to prevent arcing while providing a stable electrode spacing for a uniform electric field. The electrodes are coated onto alumina in a pattern that establishes a separation between the electrodes and the connectors of alternate electrodes suitable to prevent voltage leakage.

U.S. Pat. No. 6,338,827 to Nelson et al., commonly assigned, entitled "Stacked Shape Plasma Reactor Design for Treating Auto Emissions," which is hereby incorporated by reference herein in its entirety, discloses a non-thermal plasma reactor element prepared from a planar arrangement of formed shapes of dielectric material. The shapes are used as building blocks for forming the region of the reactor wherein the plasma is generated. Individual cells are provided with a conductive print disposed on a formed shape to form electrodes and connectors. In a preferred embodiment, the conductive print comprises a continuous grid pattern having a cutout region disposed opposite the terminal connector for reducing potential charge leakage. Multiple cells are stacked and connected together to form a multi-cell reactor element.

Commonly assigned U.S. patent application Ser. No. 09/517,681, filed Mar. 2, 2000 entitled "Plasma Reactor Design for Treating Auto Emissions—Durable and Low Cost," which is hereby incorporated by reference herein in its entirety, discloses a non-thermal plasma reactor element for conversion of exhaust gas constituents. The reactor comprises an element prepared from an extruded monolith of dense dielectric material having a plurality of channels separated by substantially planar dielectric barriers. Conductive material printed onto selected channels forms conductive channels that are connected along bus paths to form an alternating sequence of polarity, separated by exhaust channels. Conductive channels and channels not selected for exhaust flow are plugged at end portions of the monolith with a material suitable for excluding exhaust gases and preventing electrical charge leakage between conductive channels. Exhaust channels, disposed between opposite polarity conductive channels, are left uncoated and unplugged. During operation, exhaust gas flows through channels and is treated by the high voltage alternating current plasma field. The planar shape of the dielectric barriers provides a uniform electrical response throughout the exhaust channels.

U.S. Pat. No. 6,354,903 to Nelson et al., commonly assigned, entitled "Method of Manufacture of a Plasma Reactor with Curved Shape for Treating Auto Emissions," which is hereby incorporated by reference herein in its entirety, discloses a non-thermal plasma reactor element wherein a swept shape substrate is formed and treated to create a non-thermal plasma reactor element. The substrate is formed via extrusion so that there is a series of nested, concentric dielectric barriers. Selected channels are coated with conductive material to form conductor channels capable of forming an electric field around exhaust channels. Conductive channels and channels not selected for exhaust flow are plugged at end portions of the monolith with a material suitable for excluding exhaust gases and preventing electrical charge leakage between conductive channels. Exhaust channels, disposed between opposite polarity conductive channels, are left uncoated and unplugged.

U.S. Provisional Application No. 60/249,231, of David E. Nelson, et al., filed Nov. 16, 2000, entitled "Edge-connected Non-thermal Plasma Exhaust After Treatment Device," which is hereby incorporated by reference herein in its entirety, discloses an edge-connected non-thermal plasma reactor substrate including an edge-connected frame comprising a pair of dielectric edge connectors secured at opposite ends to first and second outer dielectric plates. The dielectric edge connectors comprise a backplane and a plurality of tines protruding along at least one major surface of the backplane, the plurality of tines being spaced apart from one another at regular intervals so as to form pockets between adjacent tines. A plurality of alternating polarity electrode plates are disposed within the edge-connected frame in an alternating polarity arrangement that defines the presence of at least one dielectric barrier next to a plasma cell with the pockets compliantly engaging opposite ends of the electrode plates.

While the above-described non-thermal plasma reactors meet some of the current needs and objectives in the art, there remain several issues that need to be more effectively addressed.

Current stacked planar designs without structural ligaments are prone to fracture during use in automotive exhaust applications if the unsupported span of the dielectric barrier becomes large (fracture is often observed when the length of unsupported span approaches about 30 millimeters for a 0.5 millimeter thick alumina dielectric barrier). This failure can be induced by gas flow and vibration induced stresses leading to deflection of the dielectric barriers. NOx conversion efficiency can be negatively affected even with slight deflection of the dielectric barriers due to gas by-pass between plates or from plasma field variation.

Current non-thermal plasma reactor elements having structural ligaments provide improved durability over ligament-free elements. However, the improved durability comes at a cost of lower NOx conversion efficiency than is achieved over a similar length region with ligament-free designs. While structural ligaments are desirable for increasing structural durability, these same structural ligaments have a deleterious effect on non-thermal plasma reactor conversion efficiency due to their interaction with the electric field in the plasma.

Many currently known stacked planar reactor elements are expensive to manufacture. Planar designs using metallized dielectric plates and discrete spacers need fixturing to hold each spacer in place relative to the metallized dielectric plates during assembly, and there are many discrete parts that must be handled. Formed C-shapes or box shapes simplify the stack assembly process since relatively simple tooling is used to align the stack. However, as a result of these and other issues, there remains a need in the art for a non-thermal plasma reactor element providing improved reactor durability and improved NOx conversion efficiency at reduced cost.

SUMMARY OF THE INVENTION

In a first embodiment, the present invention provides a multi-cell non-thermal plasma reactor stack comprising:
a plurality of alternating polarity unit cells, individual unit cells comprising a pair of low-loss electrode-printed structural dielectric barriers;
the electrode-printed structural dielectric barriers having a first side and a second opposite side;
the second opposite side comprising a flat surface having a low-loss electrode pattern; the low-loss electrode pattern comprising first and second major electrode sections that are offset from the plan view of ribs, ligaments, spacers, tines, or other dielectric support structure present between dielectric barriers in a multi-cell reactor, a connector disposed between and electrically connecting the first and second major electrode sections and offset relative to a centerline extending through the first and second major electrode sections, and a bus path connector electrically connected to one of the first or second major electrode sections and to the side bus path and offset relative to the centerline;
at least one of the low-loss electrode-printed structural dielectric barriers in each unit cell pair comprising a ribbed structural dielectric barrier;
the ribbed structural dielectric barrier comprising a pair of side structural ribs disposed at first and second ends of the first side of the low-loss electrode printed structural dielectric barrier and at least one internal structural rib disposed between the first and second side structural ribs;
the side structural ribs and internal structural rib being an integral part of the structural dielectric barrier; and
exhaust channels provided between the pair of low-loss electrode-printed structural dielectric barriers forming each unit cell, the exhaust channels being defined by the side structural ribs.

In a second embodiment, the present invention provides a low-loss electrode-printed structural dielectric barrier for a non-thermal plasma reactor comprising:
a structural dielectric barrier having a first side and a second opposite side;
a low-loss electrode pattern disposed on the second opposite side of the structural dielectric barrier;
the low-loss electrode pattern comprising first and second major electrode sections that are offset from any ribs, supports, ligaments, spacers, tines, or other structure that serves as a structural dielectric connection between dielectric barriers in a multi-cell reactor; a connector disposed between and electrically connecting the first and second major electrode sections and offset relative to a centerline extending through the first and second major electrode sections; and a bus path connector electrically connected to one of the first or second major electrode sections and to a side bus path and offset relative to the centerline.

In a third embodiment, the present invention provides a method for preparing a multi-cell non-thermal plasma reactor stack comprising:
preparing a plurality of low-loss electrode-printed structural dielectric barriers, wherein the low-loss electrode-printed structural dielectric barriers comprise ribbed electrode-printed structural dielectric barriers or non-ribbed low-loss electrode printed structural dielectric barriers, comprising:
forming a structural dielectric barrier having a first side and a second opposite side;
firing the structural dielectric barrier;
printing a low-loss electrode pattern onto the second opposite side of the fired planar structural dielectric barrier;
the low-loss electrode pattern comprising first and second major electrode sections that are offset from the plan view of ribs; a connector disposed between and electrically connecting major electrode sections and offset relative to a centerline extending through said first and second electrode sections perpendicular to the rib orientation; and a bus path connector electrically connected to one of the major electrode areas and to the side bus path and offset relative to the centerline;
to provide a non-ribbed low-loss electrode printed structural dielectric barrier; or
optionally, forming on the first side of said structural dielectric barrier a pair of side structural ribs disposed at first and second ends of the dielectric barrier and at least one internal structural rib disposed between the pair of side structural ribs to provide a ribbed low-loss electrode printed structural dielectric barrier;

stacking a plurality of alternating polarity unit cells to form a multi-cell stack;

the unit cells having exhaust channels provided between pairs of low-loss electrode-printed structural dielectric barriers, the exhaust channels being defined by the side structural ribs;

wherein individual unit cells in the multi-cell stack comprise a pair of ribbed low-loss electrode-printed structural dielectric barriers; the ribbed low-loss electrode printed structural dielectric barriers having at least one internal structural rib and a pair of side structural ribs disposed at first and second ends of said electrode-printed planar dielectric barrier; or wherein individual unit cells in said multi-cell stack comprise a non-ribbed low-loss electrode-printed structural dielectric barrier and a ribbed electrode-printed structural dielectric barrier.

In a fourth embodiment, the present invention provides a method for preparing low-loss electrode-printed structural dielectric barriers for non-thermal plasma reactors comprising:

forming a structural dielectric barrier having a first side and a second opposite side;

firing the structural dielectric barrier;

printing a low-loss electrode pattern onto the second opposite side of said structural dielectric barrier;

the low-loss electrode pattern comprising first and second major electrode areas that are offset from the plan view of ribs, supports, ligaments, spacers, tines, or other structure that serves as a structural dielectric connection between dielectric barriers in a multi-cell reactor, a connector disposed between and electrically connecting the first and second major electrode sections and offset relative to a centerline extending through said first and second major electrode sections, and a bus path connector electrically connected to one of the first and second major electrode areas for connecting to a side bus path and offset relative to the centerline.

The present low-loss electrode non-thermal plasma reactor multi-cell stacks advantageously employ structural ribs formed as an integral part of a structural dielectric barrier (such as the embodiment comprising an E-shaped ceramic structural dielectric barrier). The flat, non-ribbed side of the structural dielectric barrier is printed with the present low-loss electrode pattern that is especially advantageous for minimizing parasitic losses encountered in previously available reactors having structural support ribs. The present low-loss electrode pattern is segmented to provide first and second major electrode sections, and each electrode section is patterned so that there is an offset distance between the structural ribs and the electrode section that is approximately equal to the distance between the pair of low-loss electric printed dielectric barriers forming the unit cell (i.e., approximately equal to the height of the exhaust channel). For ease of discussion, the low-loss electrode is discussed with respect to the offset between the electrode sections and ribs. Ribs, within the scope of the present invention, may alternately be ligaments, spacers, tines, or other dielectric support structure that serves as a structural dielectric connection between dielectric barriers in a reactor. The offset distance (and exhaust channel height) is typically about 1 to about 2 millimeters. This offset distance advantageously reduces parasitic losses by optimizing the effect of the plasma field. At the edge of the electrode pattern, a fringing charge field forms during reactor operation and the present offset allows the fringing field to treat gas flowing through the offset region while substantially limiting the electric field that is exposed to the structural rib (or other dielectric support structure). Since the structural rib is not substantially exposed to the electric field, any deleterious effect the rib may have on the plasma field is reduced or eliminated altogether thereby enhancing NOx conversion efficiency. The actual offset distance between the segmented electrode pattern and the structural ribs is fine-tuned by empirical testing.

The segmented electrodes have thin connecting paths that extend over one side structural rib (i.e., a connecting path providing the bus path connector to power or ground) and any internal ribs (i.e., a connecting path providing electrical connection between electrode sections). The connecting path width is selected to provide a width sufficient to accommodate the maximum current flow. The connecting paths are offset relative to a centerline extending through the electrode so that when assembled into a multi-cell reactor, there is increased distance between opposite polarity connection paths within and around the dielectric ribs, ligaments, spacers, tines, or other dielectric support structure. The increased distance reduces the effective charge acting on dielectric ribs to minimize parasitic losses.

The low-loss electrode pattern of the present invention is advantageously employed in any parallel gap non-thermal plasma reactor. For example, the present low-loss electrode pattern is advantageously employed in multi-cell reactor stacks using discrete spacers and edged-connected planar non-thermal plasma reactors designed to minimize spacer or ligament-related parasitic losses as taught in commonly assigned U.S. Provisional Application No. 60/249,231, of David E. Nelson, et al., filed Nov. 16, 2000, entitled "Edge-connected Non-thermal Plasma Exhaust After Treatment Device."

The present low-loss electrode printed structural dielectric barrier non-thermal plasma reactor multi-cell stack provides improved durability and NOx conversion efficiency along with reduced manufacturing costs over previously known reactors. Advantageously, the low-loss electrode pattern can be used for opposite polarity dielectric plates in the multi-cell arrangement thereby simplifying manufacturing.

These and other features and advantages of the invention will be more fully understood from the following description of certain specific embodiments of the invention taken together with the accompanying drawings.

BRIEF DESCRIPTION OF THE DRAWINGS

Referring now to the drawings, which are meant to be exemplary, not limiting, and wherein like elements are numbered alike in the several Figures.

DESCRIPTION OF THE PREFERRED EMBODIMENT

The present invention provides a low-loss electrode-printed structural dielectric barrier for a non-thermal plasma reactor and non-thermal plasma reactors having structural dielectric barriers printed with low-loss electrode patterns and a method for preparing the same. The low-loss electrode-printed structural dielectric barrier for a non-thermal plasma reactor comprises a structural dielectric barrier having a first side and a second opposite side; a low-loss electrode pattern disposed on the second opposite side of the structural dielectric barrier; the low-loss electrode pattern comprising first and second major electrode sections that are offset from any ribs, supports, ligaments, spacers, tines, or other structure that serves as a structural dielectric connection between dielectric barriers in a multi-cell reactor, a connector disposed between and electrically connecting the first and second major electrode sections and offset relative to a centerline extending through said first and second major electrode sections perpendicular to the rib orientation, and a bus path connector electrically connected to one of the major electrode areas and to a side bus path and offset relative to the centerline. The present invention will be described herein with respect to a low-loss electrode printed E-shaped structural dielectric barrier. However, the present invention is not limited to any particular dielectric barrier shape or reactor configuration, but rather contemplates variously shaped low-loss electrode dielectric barriers and non-thermal plasma reactors.

Figure 1:
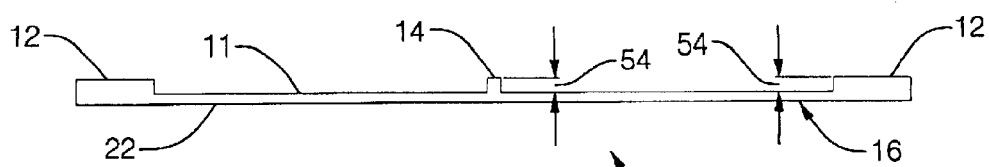
FIG. 1 is a view of an E-shaped ribbed structural dielectric barrier having two side structural ribs and one internal structural rib in accordance with one embodiment of the present invention.

Turning now to the FIGURES, FIG. 1 depicts one possible embodiment of the present invention comprising a ribbed E-shaped structural dielectric barrier 10 having a first 11 having a pair of side structural ribs 12, an internal structural rib 14, a planar dielectric barrier 16, and a second side 22. The E-shaped structural dielectric barrier 10 can be manufactured by roll compacting, dry pressing, extruding, laminating, or other techniques known in the art.

Figure 2:
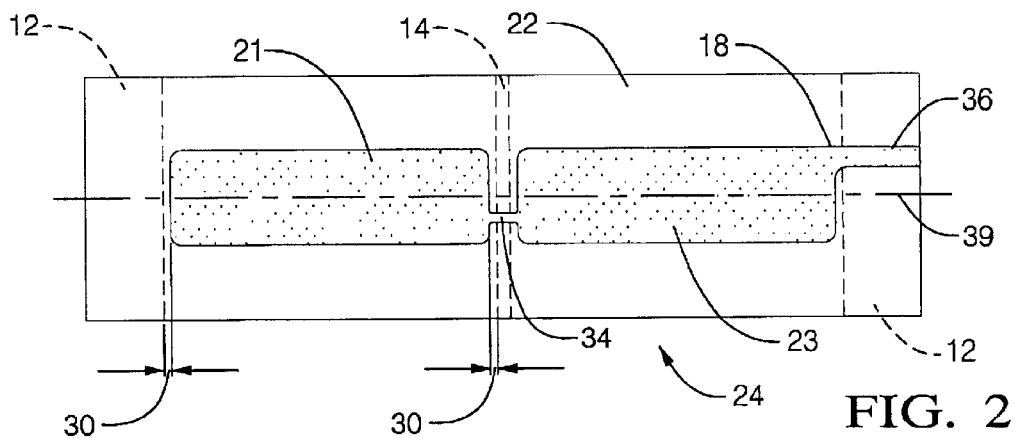
FIG. 2 is a view of an E-shaped structural dielectric barrier in accordance with FIG. 1 printed with a low-loss electrode pattern to provide a low-loss electrode printed E-shaped dielectric barrier.
Figure 3:
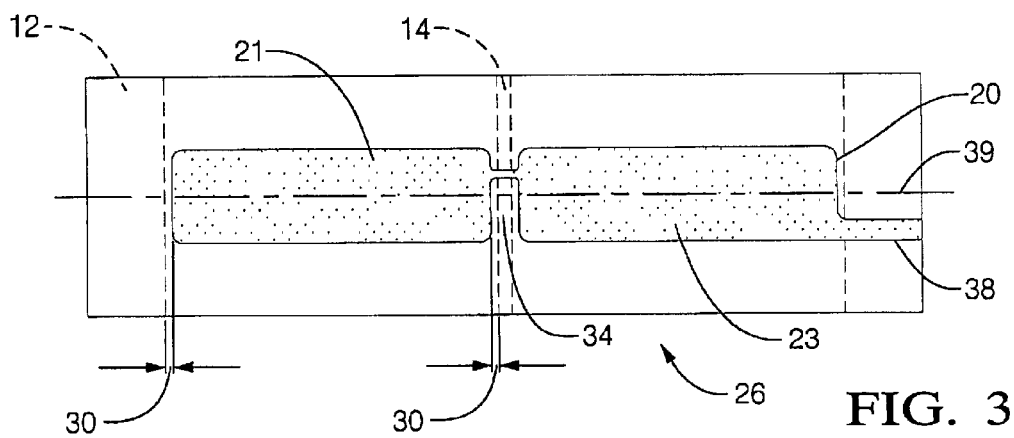
FIG. 3 is a view of an E-shaped structural dielectric barrier in accordance with FIG. 1 printed with a low-loss electrode pattern that is complementary to the pattern of FIG. 2.

As shown in FIGS. 2 and 3, complementary segmented low-loss electrode patterns 18 and 20 are disposed on second, flat sides 22 of two E-shaped structural dielectric barriers 10 to form low-loss E-shaped electrode-printed dielectric barriers 24 (FIG. 2) and 26 (FIG. 3). The side structural ribs 12 and internal structural rib 14 of the first side 11 are shown in phantom to illustrate the location of the electrode patterns 18 and 20 relative to the side structural ribs 12 and internal structural rib 14. Electrode pattern 18 comprises first and second major electrode sections 21 and 23, respectively, electrically connected by connecting path 34, and first polarity bus path connector 36. Electrode pattern 20 comprises first and section major electrode sections 21 and 23, respectively, electrically connected by connecting path 34, and second polarity bus path connector 38. Connecting paths 34 and first and second polarity bus path connectors 36, 38, are offset from a centerline 39 extending through electrode patterns 18 and 20 so that when assembled into a multi-cell stack, there is increased distance between connecting paths 34, opposite polarity connection paths 36, 38 and dielectric ribs 12, 14. The increased distance reduces the effective charge acting on dielectric ribs 12, 14 to minimize parasitic losses.

Figure 5:
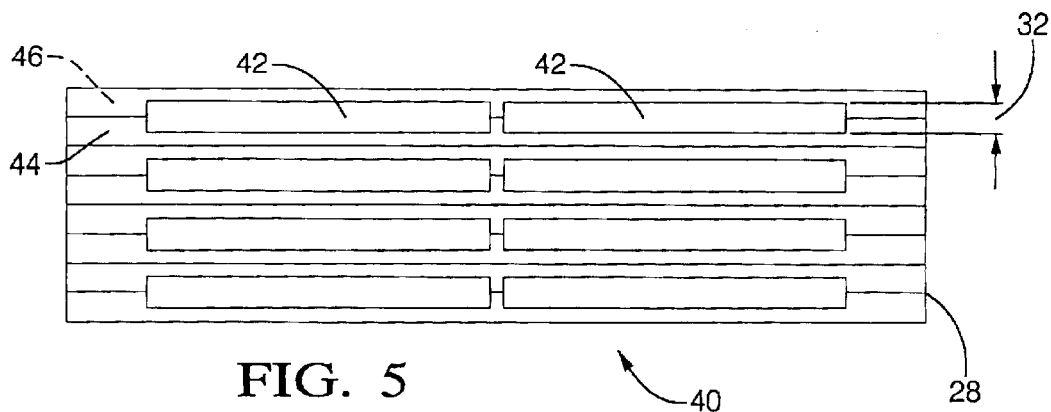
FIG. 5 is a view of a non-thermal plasma reactor multi-cell stack having a plurality of the unit cells of FIG. 3.

Electrode patterns 18 and 20 are segmented to provide first and second major electrode sections 21 and 23 which approach the side structural ribs 12 and internal structural ribs 14 to within an offset distance 30 that is approximately equal to the size of the gap (height of exhaust channel) 32 between the E-shaped electrode-printed structural dielectric barriers 24, 26 when stacked to form the non-thermal plasma reactor multi-cell stack 40 (shown in FIG. 5). The distance 30 between the electrode and the structural rib is determined by the point of highest NOx conversion efficiency, i.e., providing an electrode pattern that is as large as possible and extends in the direction of the side structural ribs 12 and internal structural ribs 14 as near as possible to the ribs 12, 14 while simultaneously minimizing the deleterious effect of parasitic losses and exhaust gas blow-by. Connectors 34 provide electrical connection between the major electrode sections 21, 23 of the electrodes 24, 26 and are offset according to power or ground polarity to reduce parasitic loss associated with the structural ribs 14. Bus path connectors 36, 38 provide electrical connection to power or ground bus paths (not shown) connecting to a high voltage power source and ground. Connectors 34 and bus path connectors 36 and 38 are patterned so that when the E-shaped electrodes 24, 26 are assembled, opposite polarity paths are also offset according to power or ground polarity to reduce parasitic loss from the side structural ribs. For example, FIGS. 2 and 3 show complementary electrode patterns 18 and 20, respectively.

Figure 4:
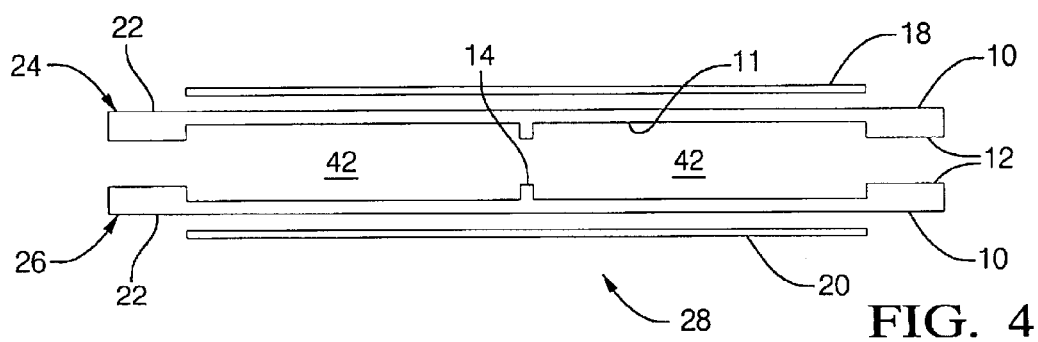
FIG. 4 is an exploded view of a non-thermal plasma reactor unit cell comprising two low-loss electrode printed E-shaped structural dielectric barriers paired together to form an individual unit cell.

FIG. 4 depicts in partially exploded form two E-shaped low-loss electrode-printed dielectric barriers 24 and 26 paired together to form an individual unit cell 28. FIG. 5 shows a plurality of alternating polarity individual unit cells 28 stacked to provide a non-thermal plasma reactor multi-cell stack 40 in accordance with one embodiment of the present invention. Low-loss electrode-printed structural dielectric barriers, such as E-shaped low-loss electrode printed dielectric barriers 24, 26, having complementary electrode patterns 18 and 20 are paired together with the electrode patterns arranged in mirror image fashion to form a first polarity electrode pair. In preparing the multi-cell reactor stack 40, the adjacent pair of low-loss E-shaped electrodes 24, 26 are rotated 180 degrees to create a second polarity electrode pair. The stacking is repeated as desired to form the multi-cell stack 40 of alternating polarity unit cells. In an alternate embodiment, alternating polarity unit cells are arranged relative to one another to locate both the power and ground bus connecting paths 36, 38 on the same side of the reactor stack 40.

The process for preparing the present ribbed or rib-free low-loss electrode-printed structural dielectric barriers comprises:

forming a shaped dielectric barrier having a first side 11 and a second side 22 using a process such as roll compacting, dry pressing, laminating, or extruding;

firing the shaped structural dielectric barrier;
applying a low-loss electrode pattern 18, 20 onto the second side 22 of the structural dielectric barrier; and
optionally, forming one or more integral structural ribs 12, 14 on the first side 11 of the structural dielectric barrier.

Forming the integral structural ribs 12, 14 may comprise forming the ribs on the first side 11 of the shaped structural dielectric barrier during the roll compacting, dry pressing, laminating, extruding, or other process used to form the shaped structural dielectric barrier. Forming the integral structural ribs 12, 14 may alternately comprise, for example, using post-fire grinding, machining, or using a segmented roll compaction tool or other technique to form the ribs 12, 14 on the first side 11 of the shaped structural dielectric barrier.

Applying the low-loss electrode pattern 18, 20 may comprise, for example, printing a silver-containing thick film in the desired pattern onto the second side 22 of the structural dielectric barrier. The electrode pattern may be applied to the second side 11 after post fire grinding or other machining to form the integral structural ribs 12, 14 provided the electrode firing induced camber is not significant.

The method comprises printing the low-loss electrode pattern with connecting paths 34 that connect first and second major electrode sections and with bus path connectors 36, 38 wherein connecting paths 34 and bus path connectors 36, 38 are offset relative to centerline 39 extending through the first and second major electrode sections 21, 23 to provide increased distance between opposite polarity paths in a multi-cell stack to reduce parasitic losses through ribs.

The present low-loss electrode printed dielectric barriers are advantageously employed in other non-thermal plasma reactor configurations. The low-loss electrode dielectric barriers minimize parasitic electrical losses through dielectric spacers, ribs, ligaments, or other dielectric support structures. For example, in U.S. patent application Ser. No. 09/465,073, U.S. Pat. No. 6,338,827, U.S. patent application Ser. No. 09/517,681, U.S. Pat. No. 6,354,903 to Nelson et al., and U.S. Provisional Application No. 60/249,231, all of which have been incorporated herein by reference, parasitic losses through dielectric supports are reduced by employing the low-loss electrode pattern disclosed herein. Preferably, the electrode pattern is offset from the dielectric ribs, spacers, ligaments, support tines, or other dielectric support structure, by a distance that is about equal to the exhaust channel gap height. Where there are internal ribs, spacers, ligaments, support tines, or other dielectric support structure, the bus connection paths should be offset relative to a centerline 39 extending through the major electrode sections to increase the distance between opposite charged paths in a multi-cell reactor. This embodiment advantageously allows rigid structural dielectric barrier shapes to be employed to prevent deflection while presenting a parallel gap for the plasma in an efficient package.

Turning to FIG. 5, a multi-cell non-thermal plasma reactor stack 40 having a plurality of cells 28 prepared from low-loss electrode printed E-shaped dielectric barriers 24, 26 is shown. Exhaust channels 42 are defined by the side structural ribs 12 and the internal structural ribs 14. A high temperature-capable dielectric encapsulent (not shown), such as zinc borosilicate glass-ceramic, is applied over the front 44 and rear face 46 of the multi-cell stack 40. High temperature capable means that the dielectric encapsulent has a glass softening point above the maximum use temperature for the reactor, typically about 500° C. to about 600° C. The encapsulent is applied using a screen printing process, a rolling process, or any other process that allows application of the encapsulent over the front and rear faces 44, 46 without constricting the exhaust channels 42. The dielectric encapsulent prevents exhaust gas flow from entering gaps that may exist between the low-loss electrode printed E-shaped structural dielectric barriers 24, 26 and thus eliminates the possibility of exhaust gas blow-by while reducing deflection stress on the dielectric barriers. The encapsulent further helps to hold the multi-cell stack 40 together. Connecting bus paths (not shown) run down the side of the multi-cell stack 40 connecting the corresponding polarity bus path connectors 36, 38. The bus paths are also covered with a high temperature-capable encapsulent to protect the bus paths against deterioration or contamination. Side structural ribs 12 contain the plasma within the exhaust channels 42 and prevent potential charge leakage to other cells or to the reactor housing (not shown). The internal structural ribs 14 provide improved durability to the reactor multi-cell stack 40 by increasing the stiffness and preventing deflection of the dielectric barriers.

Figure 6:
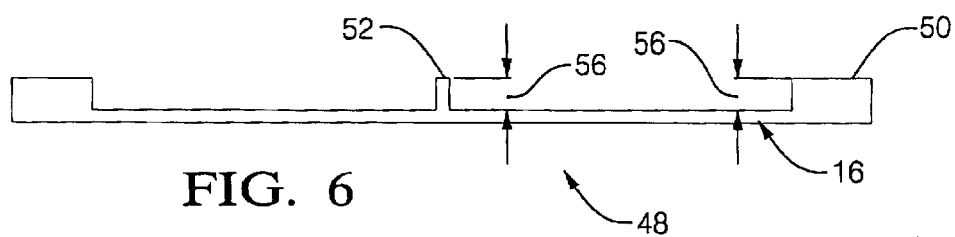
FIG. 6 is a view of an E-shaped ribbed structural dielectric barrier having side structural ribs and internal structural ribs in accordance with an alternate embodiment of the present invention.

FIG. 6 shows an alternate embodiment E-shaped structural dielectric barrier 48 having side structural ribs 50, internal structural rib 52, and planar dielectric barrier 16. In this embodiment, side structural ribs 50 and internal structural rib 52 are taller than the side structural ribs 12 and internal structural ribs 14 of the embodiment of FIG. 1. In the embodiment of FIG. 1, the exhaust channel gap 32 is twice the height 54 of the side structural ribs 12 and internal structural ribs 14. In the embodiment of FIG. 6, the height 56 of the side structural ribs 50 and internal structural rib 52 sets the exhaust channel gap 60 when the E-shaped structural dielectric barrier 48 is used to prepare a multi-cell stack 62 in accordance with an alternate embodiment of the present invention. Stack 62 is shown in FIG. 8.

Figure 7:
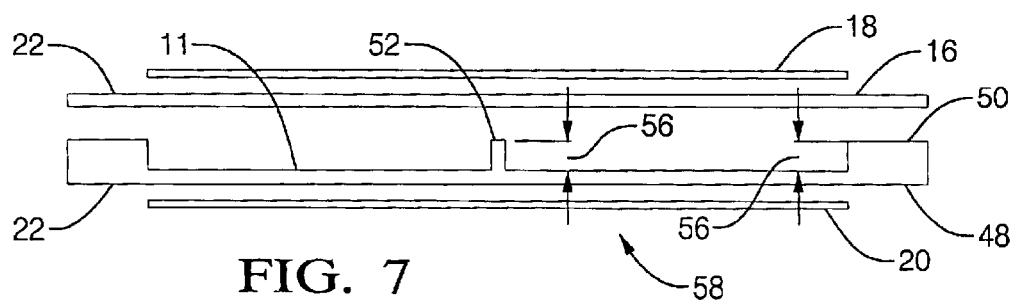
FIG. 7 is an exploded view of a non-thermal plasma reactor unit cell comprising a low-loss electrode printed E-shaped structural dielectric barrier in accordance with the embodiment of FIG. 6 and a low-loss electrode printed planar dielectric barrier to form an individual unit cell in accordance with an alternate embodiment of the present invention.

Individual alternating polarity unit cells may comprise a ribbed low-loss electrode printed structural dielectric barrier and a planar low-loss electrode-printed structural dielectric barrier. FIG. 7 shows in exploded form a unit cell 58 comprising one low-loss electrode printed E-shaped structural dielectric barrier 48 and one low-loss electrode printed planar dielectric barrier 16 (i.e., a rib-free barrier shape). This embodiment provides lower cost construction than embodiments using pairs of ribbed shaped structural dielectric barriers to form the individual unit cells because the planar shaped (rib-free) barriers can be fabricated more cost effectively due to their simplified shape.

Figure 8:
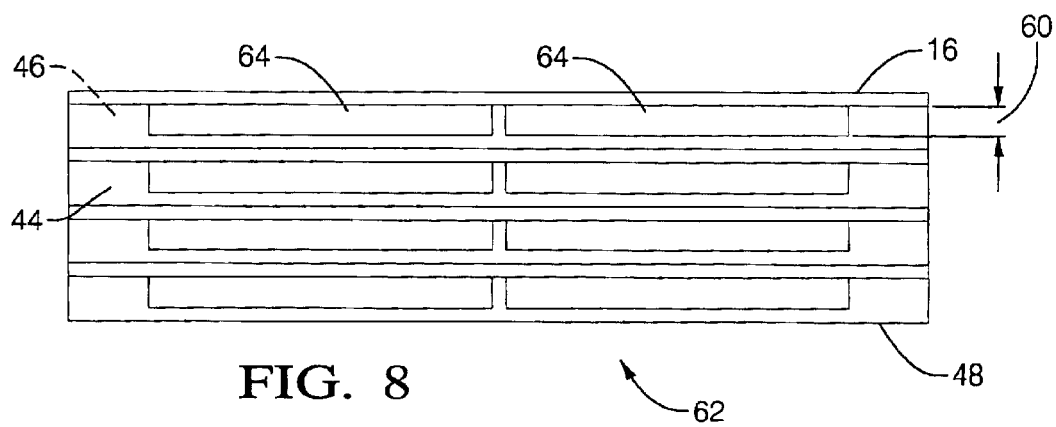
FIG. 8 is a view of a non-thermal plasma reactor multi-cell stack having a plurality of unit cells in accordance with the embodiment of FIG. 7.

FIG. 8 shows a non-thermal plasma reactor multi-cell stack 62 comprising unit cells 58 having a low-loss electrode printed E-shaped structural dielectric barrier 48 and a low-loss electrode printed planar (rib-free) dielectric barrier 16. The height 56 of the side structural ribs 12 in this embodiment determines the gap size 60 of the exhaust channels 64. As with previous embodiments, a high temperature-capable dielectric encapsulent (not shown) such as zinc borosilicate glass-ceramic, is applied over the front face 44 and rear face 46 of the multi-cell stack 62 is a manner that does not constrict exhaust channels 64. For example, the encapsulent may be disposed on the front and rear faces 44, 46 using a screen printing or rolling process. As with the embodiment of FIG. 5, the dielectric encapsulent prevents exhaust gas flow from entering gaps that may exist between the dielectric barriers 16, 48 and thus eliminates the potential for exhaust gas blow-by while reducing deflection stress on the dielectric barriers 16, 48. The encapsulent exhibits good adhesion to the front face 44 and rear face 46 and helps to hold the multi-cell stack 62 together. Connecting bus paths (not shown) run along the side of the multi-cell stack 62 electrically connecting the corresponding polarity bus path connectors 36, 38. Again, the bus paths are covered by a high temperature-capable encapsulent to protect the bus path against deterioration or contamination.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A multi-cell non-thermal plasma reactor stack comprising:
   a plurality of alternating polarity unit cells, wherein each individual unit cell comprises a pair of low-loss electrode-printed structural dielectric barriers;
   said electrode-printed structural dielectric barriers having a first side and a second opposite side;
   said second opposite side comprising a flat surface having a low-loss electrode pattern; said low-loss electrode pattern comprising first and second major electrode sections that are offset from ribs present between dielectric barriers in a multi-cell reactor stack, a connector disposed between and electrically connecting said first and second major electrode sections, said connector being offset relative to a centerline extending through said first and second major electrode sections, and a bus path connector electrically connected to one of said first or second major electrode sections and offset relative to said centerline;
   at least one of said low-loss electrode-printed structural dielectric barriers in each individual unit cell comprising a ribbed structural dielectric barrier;
   said ribbed structural dielectric barrier comprising a pair of side structural ribs disposed at first and second ends of said first side of said low-loss electrode printed structural dielectric barrier and at least one internal structural rib disposed between said first and second side structural ribs;
   said side structural ribs and said internal structural rib being an integral part of said structural dielectric barrier; and
   exhaust channels provided between said pair of low-loss electrode-printed structural dielectric barriers forming said individual unit cell, said exhaust channels being defined by said side structural ribs.

2. The reactor stack of claim 1, wherein:
   the pair of low-loss electrode printed structural dielectric barriers that comprise at least one of said individual unit cells are ribbed.

3. The reactor stack of claim 2, wherein:
   said pair of ribbed low-loss electrode printed structural dielectric barriers comprise a pair of low-loss electrode-printed E-shaped structural dielectric barriers;
   said E-shaped electrode-printed structural dielectric barriers having on a first side thereof a pair of side structural ribs disposed at first and second ends of said structural dielectric barrier and an internal structural rib disposed between said pair of side structural ribs to provide said E-shaped electrode-printed structural dielectric barriers.

4. The reactor stack of claim 1, wherein said individual unit cells comprise:
   a ribbed low-loss electrode printed structural dielectric barrier; and
   a planar low-loss electrode-printed structural dielectric barrier.

5. The reactor stack of claim 4, wherein said exhaust channels have a height that is equal to the height of said side structural ribs.

6. The reactor stack of claim 4, wherein said ribbed low-loss electrode printed structural dielectric barrier comprises an E-shaped electrode-printed structural dielectric barrier;
   said E-shaped electrode-printed structural dielectric barrier having on a first side thereof a pair of side structural ribs disposed at first and second ends of said structural dielectric barrier and an internal structural rib disposed between said pair of side structural ribs to provide said E-shaped electrode-printed structural dielectric barrier.

7. The reactor stack of claim 1, wherein said exhaust channels have a height; and
   said low-loss electrode pattern extends along said second side of said structural dielectric barriers in the direction of said side structural ribs and said internal structural ribs to provide an offset distance between said low-loss electrode and said side structural ribs and said internal structural ribs that is approximately equal to said height of said exhaust channels.

8. The reactor stack of claim 1, wherein said plurality of alternating polarity unit cells comprise:
   a first pair of low-loss electrode-printed structural dielectric barriers having complementary electrode patterns arranged in mirror image fashion and wherein said first pair of low-loss electrode-printed structural dielectric barriers provide a first polarity unit cell; and
   a second adjacent pair of electrode-printed structural dielectric barriers having complementary electrode patterns arranged in mirror image fashion and rotated 180 degrees with respect to said electrode patterns of said first polarity cell to provide a second polarity unit cell.

9. The reactor stack of claim 1, wherein said plurality of alternating polarity unit cells comprise:
   adjacent pairs of said low-loss electrode-printed structural dielectric barriers providing said plurality of alternating polarity unit cells;
   said plurality of alternating polarity unit cells arranged relative to one another to locate both power and ground bus connecting paths on a single side of said multi-cell stack.

10. A low-loss electrode-printed structural dielectric barrier for a non-thermal plasma reactor comprising:
    a structural dielectric barrier having a first side and a second opposite side;
    a low-loss electrode pattern disposed on said second opposite side of said structural dielectric barrier;
    said low-loss electrode pattern comprising a segmented electrode having first and second major electrode sections offset from dielectric support structures present between dielectric barriers in a multi-cell reactor stack;
    a connector disposed between and electrically connecting said first and second major electrode sections and offset relative to a centerline extending through said first and second major electrode sections; and
    a bus path connector electrically connected to one of said first or second major electrode sections and offset relative to said centerline.

11. The low-loss electrode-printed structural dielectric barrier of claim 10, wherein said dielectric support structures comprise structural ribs, ligaments, spacers, or tines.

12. The low-loss electrode-printed structural dielectric barrier of claim 10, wherein said low-loss electrode-printed structural dielectric barrier comprises an E-shaped ribbed low-loss electrode-printed structural dielectric barrier;

said E-shaped electrode-printed structural dielectric barrier having on said first side thereof a pair of side structural ribs disposed at first and second ends of said structural dielectric barrier and an internal structural rib disposed between said pair of side structural ribs.

13. A method for preparing a multi-cell non-thermal plasma reactor stack comprising:

preparing a plurality of low-loss electrode-printed structural dielectric barriers, wherein said low-loss electrode-printed structural dielectric barriers comprise ribbed electrode-printed structural dielectric barriers or non-ribbed low-loss electrode printed structural dielectric barriers, said preparing comprising:

forming a structural dielectric barrier having a first side and a second opposite side;

firing said structural dielectric barrier;

printing a low-loss electrode pattern onto said second opposite side of said fired structural dielectric barrier;

said low-loss electrode pattern comprising first and second major electrode sections offset from ribs present between dielectric barriers in a multi-cell reactor stack, a connector disposed between and electrically connecting said first and second major electrode sections and offset relative to a centerline extending through said first and second major electrode sections, and a bus path connector electrically connected to one of said first or second major electrode sections and offset relative to said centerline;

forming on said first side of at least one structural dielectric barrier a pair of side structural ribs disposed at first and second ends of said dielectric barrier and at least one internal structural rib disposed between said pair of side structural ribs; and stacking a plurality of alternating polarity unit cells to form a multi-cell reactor stack;

said individual unit cells having exhaust channels provided between pairs of low-loss electrode-printed structural dielectric barriers, said exhaust channels being defined by said side structural ribs;

wherein said individual unit cells in said multi-cell reactor stack comprise a pair of ribbed low-loss electrode-printed structural dielectric barriers; said ribbed low-loss electrode printed structural dielectric barriers having at least one internal structural rib and a pair of side structural ribs disposed at first and second ends of said electrode-printed structural dielectric barriers; or wherein said individual unit cells in said multi-cell reactor stack comprise a non-ribbed low-loss electrode-printed structural dielectric barrier and a ribbed electrode-printed structural dielectric barrier.

14. The method of claim 13, wherein said ribbed low-loss electrode printed structural dielectric barriers comprises a low-loss electrode-printed E-shaped structural dielectric barriers;

said low-loss electrode printed E-shaped structural dielectric barriers having on a first side thereof a pair of side structural ribs disposed at first and second ends of said structural dielectric barrier and an internal structural rib disposed between said pair of side structural ribs to provide said low-loss electrode printed E-shaped structural dielectric barriers.

15. The method of claim 13, wherein said exhaust channels have a height that is equal to the height of said side structural ribs.

16. The method of claim 13, wherein said ribbed low-loss electrode printed structural dielectric barrier comprises an E-shaped electrode-printed structural dielectric barrier;

said E-shaped electrode-printed structural dielectric barrier having on a first side thereof a pair of side structural ribs disposed at first and second ends of said structural dielectric barrier and an internal structural rib disposed between said pair of side structural ribs to provide said E-shaped electrode-printed structural dielectric barrier.

17. The method of claim 13, wherein said printing comprises printing said low-loss electrode pattern extending toward said side structural ribs and said internal structural ribs to within an offset distance that is approximately equal to the height of said exhaust channels.

18. The method of claim 13, wherein said printing comprises printing said low-loss electrode pattern with connecting paths that connect said first and second major electrode sections or with a bus path connector connected to one of said first or second major electrode section, wherein said connecting paths and bus path connector are offset relative to said centerline extending through said first and second major electrode sections to provide increased distance between opposite polarity paths in a multi-cell stack to reduce parasitic losses through ribs.

19. The method of claim 13 wherein said printing comprises printing a low loss electrode pattern wherein said pattern is used for opposite polarity dielectric plates in a multi-cell arrangement in order to simplify manufacturing.

20. The method of claim 13, wherein said stacking a plurality of alternating polarity unit cells comprises:

stacking a first pair of low-loss electrode-printed structural dielectric barriers having complementary electrode patterns arranged in mirror image fashion so that said first pair of electrode-printed structural dielectric barriers provide a first polarity unit cell; and stacking adjacent said first pair electrode-printed structural dielectric barriers a second pair of low-loss electrode-printed structural dielectric barriers having complementary mirror image electrode patterns that are rotated 180 degrees with respect to said electrode patterns of said first polarity unit cell to provide a second polarity unit cell; and repeating stacking as desired to form a multi-cell stack of alternating polarity unit cells.

21. The method of claim 13, wherein said stacking comprises:

arranging adjacent pairs of said low-loss electrode-printed structural dielectric barriers relative to one another so as to locate both power and ground bus connecting paths on a single side of said multi-cell stack.

22. A method for preparing low-loss electrode-printed structural dielectric barriers for non-thermal plasma reactors comprising:

forming a structural dielectric barrier having a first side and a second opposite side;

firing said structural dielectric barrier;

printing a low-loss electrode pattern onto said second opposite side of said structural dielectric barrier;

said low-loss electrode pattern comprising first and second major electrode sections that are offset from ribs, supports, ligaments, spacers, tines, or other structure that serves as a structural dielectric connection between dielectric barriers in a multi-cell reactor; a connector disposed between and electrically connecting said first and second major electrode sections and offset relative to a centerline extending through said first and second major electrode sections; and a bus path connector electrically connected to one of said first or second major electrode sections and offset relative to said centerline.

23. The method of claim 22, further comprising:

preparing on said first side of said low-loss electrode-printed planar structural dielectric barrier as an integral part of said barrier a pair of side structural ribs disposed at first and second ends of said electrode-printed dielectric barrier and at least one internal structural rib disposed between said pair of side structural ribs.

24. The method of claim 23, wherein said preparing said first side of said electrode-printed structural dielectric barrier to include integral structural ribs comprises grinding, machining, or using a segmented roll compaction tool to provide said integral structural ribs.

25. The method of claim 22, wherein said forming comprises roll compacting, dry pressing, laminating, or extruding.

* * * * *